March 19, 1929.   J. L. ROSSON   1,706,129
SAW FOR DELINTING MACHINES
Filed Oct. 13, 1928
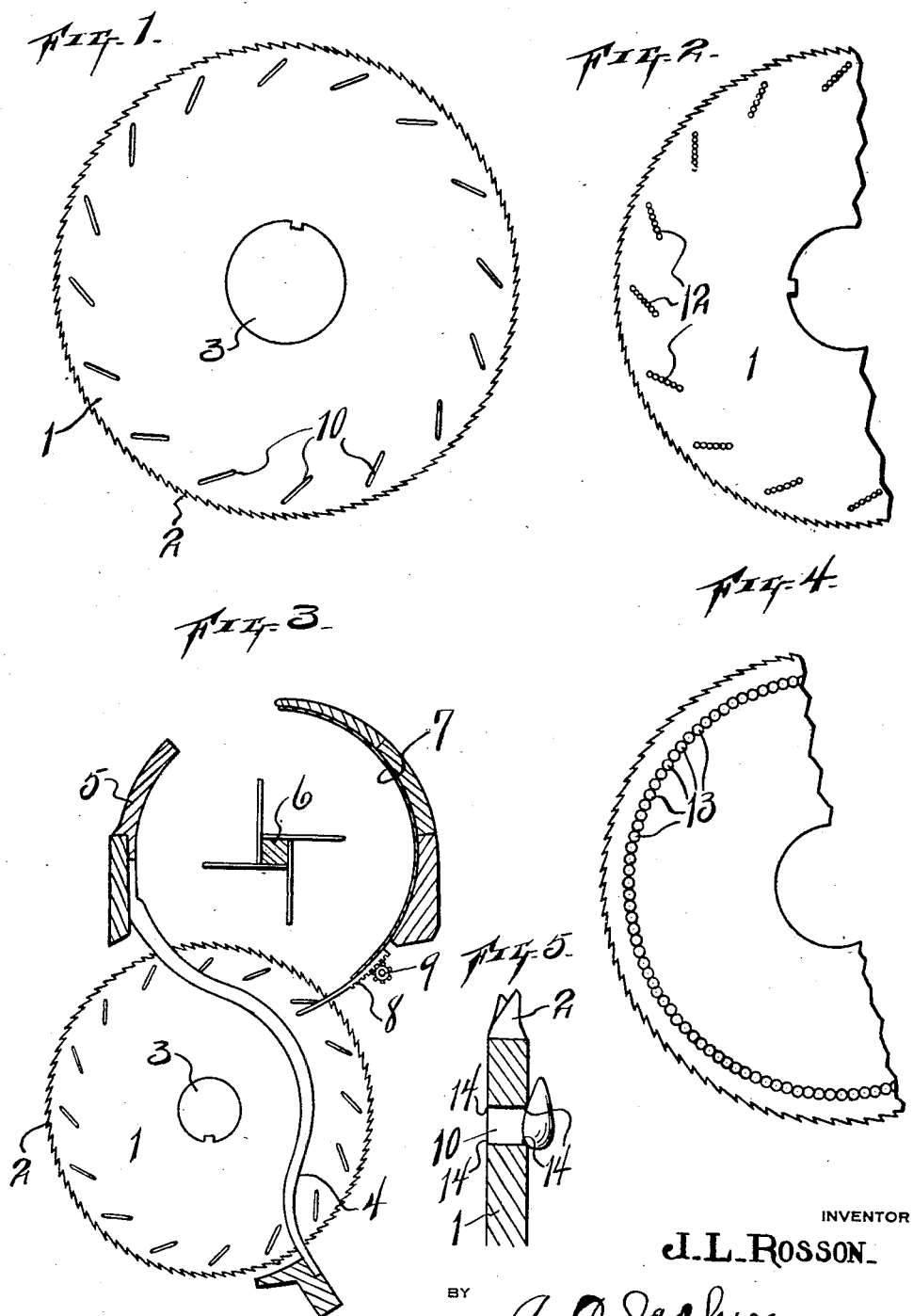
INVENTOR
J. L. ROSSON
BY
A. P. Jackson
ATTORNEY Patented Mar. 19, 1929.

1,706,129

UNITED STATES PATENT OFFICE.

JOSEPH L. ROSSON, OF DALLAS, TEXAS.

SAW FOR DELINTING MACHINES.

Application filed October 13, 1928. Serial No. 312,275.

My invention relates to saws for use in delinting cotton seed; and the object is to provide saws for removing more of the lint from the cotton seed and particularly for removing the shorter fibres of lint which are adapted for manufacturing rayon. The advantage of the improved saws is that seed are repeatedly thrown towards the peripheries of the saws or in the saw tooth zone. The seed are thrown by centrifugal force outwardly by the openings in the saws. The tendency of the seed is to become banked or packed between the saws and the function of the holes in the saws is to make the edges of the holes engage the seed sufficiently to throw the seed outwardly towards the roll in the roll box. Another advantage of the improved saws is that they relieve to some extent the hard packed roll of seed in the roll box. Heretofore there seemed to be an advantage in the closely packed roll of seed. With the improved saws there is no necessity of such hard-packed seed roll and one advantage is that the saws do not develop so much heat in rubbing through the looser seed. The function of throwing the seed back to the stripping zone by the openings in the saws avoids the necessity of a hard-packed roll. Other objects and advantages will be fully explained in the following description and and the invention will be more particularly pointed out in the claims.

Reference is had to the accompanying drawings which form a part of this application.

Fig. 1 is a side elevation of the improved saw.

Fig. 2 illustrates a variation in the construction of the saw.

Fig. 3 illustrates the position of the improved features of the saws relative to the other parts of a delinting machine.

Fig. 4 illustrates another variation in the openings of the saw.

Fig. 5 is a broken section of a saw.

Similar characters of reference are used to indicate the same parts throughout the several views.

The drawings show sufficient parts of a delinting machine to illustrate the application of the improved saws. The saws 1 have the usual teeth 2 and shaft 3, and ribs 4 are arranged in the usual manner. The roll box 5 and the float 6 are the same as those in active use. The roll box is provided with a sheet of curved iron 7 which is in form a sector of a cylindrical construction. A grate 8 is adjustably mounted on the sector 8. The grate 8 is adjusted in the usual manner by means of a rack thereon and worm gearing 9. The grate 8 has fingers which should project within ¼ to ½ inch from the ribs 4. The grate 8 has the same curvature of the curved iron 7 which cooperates with the float 6 to form a roll in the roll box.

The saws have slots 10 therethrough which are tangentially arranged relative to the saw shaft and at angles to the radii of the saw. The slots 10 should be far enough from the teeth so that they will not interfere with the sharpening of the saws. Instead of the slots 10 the saws may have short rows of small perforations 12, as shown in Fig. 2. Another variation is shown in Fig. 4. The openings may be a circular arrangement of openings 13. Whatever the arrangement of the openings through the saws, the function is the same, that is, the seed are engaged by the openings and thrown by centrifugal force towards the zone of the saw teeth and towards the roll in the roll box and to keep the seed from banking or packing so hard, or rather to relieve the necessity of packing the seed in the roll so hard. The seed are thrown repeatedly outwardly towards the zone of the saw teeth so that the seed can be acted upon until all the short lint is removed. The short lint has become valuable in the art of making rayon which is used in making clothing, or fabrics, and mattresses and the like.

What I claim, is:—

1. A saw for delinting machines having openings therethrough spaced from the saw teeth adapted to engage cotton seed and throw the same outwardly towards the roll in a roll box.

2. A saw for delinting machines having openings therethrough systematically arranged and spaced from the saw teeth and adapted to engage and throw cotton seed towards the zone of the teeth of the saw.

3. A saw for delinting machines having spaced slots arranged in a circular series concentric to axis of and spaced from the periphery of said saw, the outer end being located near the teeth and the inner end extending forwardly in the direction of the rotation of the saw to cause seed engaged by the slots to move outwardly past the teeth on said saw.

4. A saw for delinting machines having slots therethrough near the saw teeth and systematically aranged, said slots being inclined, the outer end being located near the teeth and the iner end extending forwardly in the direction of the rotation of the saw.

5. A saw for delinting machines having slots therethrough provided with sharply defined edges and extending through the saw at right angles to the saw faces, said slots being inclined and each having an outer end located near the teeth and the inner end extending forwardly in the direction of rotation of the saw.

6. In a delinting machine provided with a roll box and means for forming rolls of cotton seed in said roll box, saws associated in operative relation to said roll box and provided with slots therethrough cooperating with said roll forming means, said slots being inclined and each having an outer end located near the teeth and the inner end extending forwardly in the direction of rotation of the saw.

In testimony whereof, I set my hand, this 2nd day of October, 1928.

JOSEPH L. ROSSON.